United States Patent Office 2,971,904
Patented Feb. 14, 1961

2,971,904
PETROLEUM PROCESS CATALYST SUPPORTED ON A MOLECULAR SIEVE ZEOLITE

Elroy Merle Gladrow and Paul Thomas Parker, Baton Rouge, La., assignors to Esso Research and Engineering Company, a corporation of Delaware No Drawing. Filed Feb. 12, 1957, Ser. No. 639,646

20 Claims. (Cl. 208—135)

The present invention relates to the preparation of catalyst, and more particularly to the preparation of catalysts suitable for the conversion of hydrocarbon fractions boiling in the naphtha range into products of improved antiknock properties. Still more particularly, the present invention relates to the preparation of supported platinum and palladium catalysts having a wide variety of applications in upgrading naphthas, such as hydroforming, hydroisomerization, dehydrogenation, aromatization, cracking, and the like.

The use of platinum group catalysts for these processes has long been known. Thus, hydroforming utilizing certain platinum catalyst supported on alumina is disclosed in U.S. Patents 2,479,109 and 2,479,110. Other suggested supports have been silica gel, active char and alumina. These materials are characterized by non-uniform size pores; these may cover the range from as small as 5 Angstroms or less to more than 100 Angstroms diameter. Also, silica gel and active char are amorphous, thus contributing further to their heterogeneous pore structure. In a hydrocarbon conversion process a hydrogen deficient coke deposit is laid down on the catalyst. With activated carbon base catalysts, this catalytic coke cannot be removed by burning or other oxidation process without destruction of the catalyst. With alumina and silica gel based catalysts, carbon is deposited but that deposited in the more minute pores requires excessive temperature and regeneration times for complete removal. Inasmuch as this can effectively cover up some of the active catalyst sites, the net result is that the catalyst continually undergoes degradation. Resort, then, to the more drastic treatments to restore the catalyst performance ultimately shortens the average life of the catalyst.

It is an object of the present invention to provide a process for upgrading naphtha fractions employing a hydrocarbon conversion catalyst supported on a highly selective adsorbent base.

It is a still further object of the present invention to provide a process for hydroforming, isomerizing, aromatizing or hydrogenating/dehydrogenating naphtha fractions employing a platinum group metal supported on a crystalline alumino-silicate support having pore openings of uniform size large enough to permit entrance of the reacting molecules.

These and other objects will appear more clearly from the detailed specification and claims which follow.

It has now been found that platinum catalysts which are particularly suited for upgrading naphthas may be prepared by employing as a support crystalline aluminosilicates having pore openings adequate to admit freely not only the interacting molecules but also the reaction product formed. The pore opening will therefore be about 6 to 15 Angstroms. The particular advantage of these silica-aluminate catalyst bases is derived from the uniformity of the pore openings which allows free ingress and egress of the reactants and reaction products, respectively.

Alumino-silicates of high activity as supports for these hydrocarbon conversion processes may be prepared by mixing and heating a high silica/alumina ratio mixture of sodium silicate and sodium aluminate. Sodium metasilicate is a preferred starting material. The reagents are mixed under carefully controlled conditions to produce a crystalline product which is subsequently base exchanged, preferably with an ammonium salt, to form a product comprising an ammonium alumino-silicate. This material is thereafter carefully heat treated to decompose and convert the ammonium alumino-silicate to the corresponding hydrogen form. The resulting product is thereafter impregnated or otherwise treated with a solution of a platinum group metal to form a catalyst of high activity for the hydrocarbon conversion reaction.

The alumino-silicates employed in accordance with the present invention differ substantially from the zeolites of commerce, not only in their crystallinity, but in the unique uniformity of their pore openings. When prepared in accordance with the process of the present invention, these openings are uniformly of about 13 Angstroms in diameter. This size opening is suitable for admitting various hydrocarbon molecule types.

To obtain the crystalline alumino-silicates of 13 Angstrom unit pore opening, the ratio of soda to silica of the sodium silicate should be at least 0.6/1 and it may be as high as 2/1; preferably the ratio is 0.7/1 to 1/1 and sodium metasilicate is the desired reagent. Water glass or sodium silicates of lower $Na_2O/SiO_2$ ratios do not form the adsorbent crystals unless subjected to extended heat soaking periods or additional soda is added to bring the soda to silica ratio within the above limits.

The composition of the sodium aluminate is less critical than that of the silicate. Sodium aluminates having any ratio of soda to alumina in the range of 1/1 to 3/1 may be employed; however, a sodium aluminate having a high ratio of soda to alumina is preferred, and a sodium aluminate having a ratio of $3Na_2O/2Al_2O_3$ is particularly desirable. The amounts of sodium silicate solution and sodium aluminate solutions are such that the ratio of silica to alumina in the final mixture is at least 2.2/1 and preferably 3/1 to 5/1. If the ratio is 2/1 or less, the openings in the crystal structure are too small.

The method of mixing the sodium metasilicate and aluminate solutions must be carried out in a manner allowing formation of a precipitate having a uniform composition. A preferred method is to add the aluminate to the silicate at ambient temperatures using rapid and efficient agitation to make a homogeneous paste. Thereafter the mixture is heated at about 180° to 250° F. for as long as 200 hours or more to ensure crystallization of the material in a form having 13 Angstrom pore openings. Heating must be carefully controlled; if the temperature rises above about 300° to 500° F., the pore openings also will not be suitable.

Thus a solution of sodium metasilicate having a concentration of about 30 to 300, preferably 100 to 200 grams $SiO_2$ per liter may be mixed with a sodium aluminate solution having an $Al_2O_3$ concentration of about 40 to 400, preferably 200 to 300 grams per liter. The amounts of silicate and aluminate solutions employed are such that the ratio of $SiO_2/Al_2O_3$ in the final mixture is in the range of 2.2/1 to 10/1, preferably about 4/1.

The precipitated crystalline sodium alumino-silicate, after the heat-soaking period, is water washed and filtered, and it may be activated by heat treatment at 400° to 1000° F. However, in accordance with the present invention, the crystals may, without heat treatment, be base exchanged directly as a slurry with ammonium hydroxide, an ammonium salt solution having a pH greater than about 4.0 to 4.5, or an ammonium derivative such as the tetraalkyl or tetraaryl ammonium salts. After the exchange has been effected, the crystalline material is washed free of salts, and then dried and calcined carefully to decompose the ammonium ion to give the corresponding hydrogen form of the crystal. The drying temperatures should be below about 250° F. During calcination, the furnace temperature is slowly increased. The ammonium salt decomposes between 450° F. and 550° F. When decomposition of the ammonium salt is essentially complete, the hydrogen form of the adsorbent may be heated at even still higher temperatures. The aluminosilicate structure remains essentially the same as that of the original ammonium form of the adsorbent.

The impregnation of the hydrogen crystalline aluminosilicate with platinum group metals may be carried out by conventional means. These metals are applied in solution and accordingly soluble compounds such as chloroplatinic acid, ammonium chloroplatinate, palladium chloride, etc., are used. The amount of catalytic metal in the finished catalyst is ordinarily between 0.01 and about 5.0 weight percent. In the case of platinum, the amount is preferably between 0.01 and 2.0%, and in the case of palladium, the amount is preferably between 0.01 and 5.0 weight percent.

The catalyst prepared in accordance with the present invention is especially suitable for hydroforming hydrocarbon fractions boiling within the motor fuel boiling range. Hydroforming reaction conditions are from about 600° to 1000° F., preferably 800° to 950° F., at pressures of from atmospheric to 1000 pounds per square inch, preferably at 50 to 250 p.s.i.g., at naphtha feed rates of about 0.25 to 4 vols. liquid feed/vol. cat./hour, preferably 1 to 2 v./v./hr. in a fixed bed unit and hydrogen-containing recycle gas is recycled at a rate of about 2,000–12,000, preferably about 6000 cubic feet per barrel of feed.

The process of the present invention may be further illustrated by the following specific examples.

Example 1

This example describes the preparation of a crystalline alumino-silicate adsorbent having uniform pore openings of about 13 Angstroms. Four hundred thirty-five grams of granular sodium metasilicate ($Na_2O.SiO_2.5H_2O$) comprising approximately 29.1% $Na_2O$ and 28.7% $SiO_2$ are dissolved in 1305 cc. $H_2O$ at room temperature. While the solution is vigorously stirred, 265 grams of a sodium aluminate solution, comprising 20% $Al_2O_3$ and having a solids composition of $3Na_2O.2Al_2O_3$, are added. After stirring the dense, thick precipitate for about 5 minutes, 1000 cc. $H_2O$ were added to dilute the slurry and facilitate stirring the slurry. Whereas the sodium silicate solution had a $Na_2O/SiO_2$ mol ratio of about 0.98/1, the approximate relative composition of the composite slurry was about $5.4Na_2O.Al_2O_3.4SiO_2$.

The mixture is heat soaked at 180° to 210° F. for 10 days. After cooling, the crystalline slurry is filtered, washed with water, and oven dried at 275° F. The crystals are then calcined 4 hours at 850° F., and examined for their adsorptive capacity. A weighed sample of the crystals is placed in an evacuated bulb maintained at 210° F., the boiling point of n-heptane. Successive increments of n-heptane are added until the internal pressure in the system reached 500 mm. Hg. It is found that the capacity of the adsorbent in this case is 0.20 cc. n-heptane (as liquid) per gram of adsorbent. When the adsorbate is toluene, the capacity is measured as 0.23 cc. toluene (as liquid) per gram of adsorbent.

A chemical analysis of the crystalline adsorbent shows 47.8% $SiO_2$, 20.2% $Na_2O$, and 32.0% $Al_2O_3$. This corresponds to an approximate molecular composition of about $Na_2O.Al_2O_3.2.5SiO_2$.

Example 2

To a 4 liter vessel are added 1 liter $H_2O$ and 500 grams extruded pellets of the 13 Angstrom crystals prepared as in Example 1. In a separate vessel, 1 lb. $NH_4Cl$ is dissolved in 1500 cc. $H_2O$ and 250 cc. conc. $NH_4OH$ solution added. This mixed solution is then added to the crystal-$H_2O$ slurry and stirred intermittently for 3 hours. The liquid was then removed by decanting and the pellets washed twice with 500 cc. $H_2O$. This ion-exchange step is repeated two times with fresh $NH_4OH$—$NH_4Cl$ solution each time. The pellets are then oven dried at about 220° F. The oven dried pellets are then placed in a cold muffle furnace and the temperature raised to 400° F. and held there for 2 hours. The temperature is then raised to 550° F., for 4 hours. During this time considerable ammonia was evolved. The temperature was finally held at 650° F. for 2 hours. A chemical analysis of the calcined material gave the composition as 6.5% $Na_2O$, 53.3% $SiO_2$, and 39.5% $Al_2O_3$, corresponding to a molar composition of about $0.25Na_2O.Al_2O_3.2.3SiO_2$. The calcined material comprises the anhydride of the hydrogen form of the alumino-silicate. The original sodium alumino-silicate analyzes about 21% $Na_2$, 48% $SiO_2$, and 30% $Al_2O_3$ for a molar composition of about

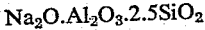

$$Na_2O.Al_2O_3.2.5SiO_2$$

It is thus seen that in the preparation about three-fourths of the sodium is replaced with hydrogen. An X-ray diffraction pattern of the hydrogen form shows the anionic network structure to be the same as with the original sodium-zeolite. The adsorptive capacity of the hydrogen form made as described above is 0.13 cc. normal heptane per gram of adsorbent.

Example 3

The hydrogen form of the alumino-silicate was prepared as described in Example 2 above, and then impregnated with 1% platinum as $PtCl_4$ solution. In this example the adsorbent, which comprises 6.5% $Na_2O$, is serving as a catalyst base in the following sets of hydrocarbon conversion operation.

(a) The catalyst was employed at 700° F., 400 p.s.i.g. 4000 c.f./b. added $H_2$ with a feed comprising 46.5 mol percent $C_6H_6$ and 63.5 mol percent n-heptane at a space velocity of 1.0 v./v./hr. The liquid product had the following composition as determined by gas chromatography.

$C_5$=1.1 mol percent
$C_6$ and $C_7$ isomers=29.2 mol percent
n-Heptane and cyclohexane=51.8 mol percent
Benzene=17.9 mol percent This example shows the hydrogenation and hydroisomerizing activity of this catalyst.

(b) The catalyst was used with methylcyclohexane feed at 850° F., 0 p.s.i.g., 27 mols $H_2$/mol methylcyclohexane and 0.6 v./v./hr. The product analysis is as follows Toluene=38.0 mol percent
Dimethylcyclopentanes=2.6 mol percent
Methylcyclohexane=59.4 mol percent This example shows the dehydrogenating and hydroisomerizing properties of the catalyst.

It should be noted that the new catalyst possesses (1 good adsorptive capacity, and (2) hydrogenation, deh drogenation, hydroisomerizing properties when co posited with an active catalytic agent such as Pt. It should be noted further that this material still retains 6.5% Na₂O, which is a potent catalyst poison in hydrocarbon conversion processes. Thus it is seen that the catalytic behavior of this material as catalyst base is little effected by relatively large amounts of soda, and other contaminants.

*Example 4*

The catalyst as prepared in Example 2 was used with a normal heptane feed at 650° F. atmospheric pressure, 27 moles hydrogen per mole feed and a feed rate of 0.6 v./v./hr. The liquid product had the following composition as determined by gas chromatography:

Isoheptanes=4.5 mole percent
n-Heptane=95.5 mole percent
Toluene=0

This example illustrates the selective hydroisomerization of this type of catalyst.

The process of the present invention may be subject to many variations without departing from its spirit. Though it finds its highest utility when a hydrogen atom replaces the bulk of the sodium atoms in the original sodium alumino-silicate, under certain circumstances it may be desirable to replace the sodium by other elements such as cobalt, nickel, zinc, magnesium, calcium, cadmium, copper, and barium, and employ the resulting crystalline composition as a support for the platinum group metals. Such materials serve not only as the support for the platinum group metal catalyst, but also possesses catalytic activity in their own right. Thus, such catalysts may serve a dual role for specific hydrocarbon conversion reactions. The other metal modifications of the adsorbent may impart greater thermal stability to the noble metal catalyst composite.

Similarly, hydrogen alumino-silicates may be prepared, albeit more laboriously, by exhaustively water washing the alkaline sodium alumino-silicate until the wash effluent has a pH essentially that of wash water. Another less desirable method is the careful washing of the sodium alumino-silicate with copious amounts of dilute acid, such as hydrochloric, acetic, sulfuric and the like. The wash acid must be so dilute that it has a pH of greater than about 3.8, and preferably above a pH of about 4.5. In this manner the original alumino-silicate structure is preserved. A lower pH value destroys the structure.

Another modification of this invention is to use the hydrogen form of the adsorbent as the support for numerous metal oxides having catalytic properties. These include $MoO_3$, $Cr_2O_3$, $WO_3$, $V_2O_5$, $CoMoO_4$, NiO, CuO, and mixtures thereof. In general, depending upon the extent of replacement of the sodium ion, the catalyst base has the composition 1.0 to 10.0% $Na_2O$, 30.0 to 40.0% $Al_2O_3$, and 45.0 to 55.0% $SiO_2$.

What is claimed is:

1. A process for upgrading hydrocarbons which comprises contacting a hydrocarbonaceous fluid at elevated temperatures with a hydrocarbon conversion catalyst selected from the class consisting of metals and compounds of the platinum group, oxides of molybdenum, chromium, tungsten, vanadium, nickel, copper, cobalt, cobalt molybdate, and mixtures thereof, deposited on a zeolitic crystalline molecular sieve alumino-silicate base having uniform pore openings between about 6 and about 15 Angstrom units, said molecular sieve being further characterized in that it contains no more than 10% sodium, calculated as $Na_2O$.

2. The process of claim 1 wherein said molecular sieve has the empirical formula:

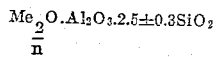

where Me represents the total hydrogen and metal cation content of the alumino-silicate, and *n* is the valence of the particular cation represented.

3. The process of claim 1 wherein said catalyst is a platinum group metal.

4. The process of claim 1 wherein a naphtha stream is hydroformed in the presence of said catalyst.

5. The process of claim 1 wherein a naphtha stream is hydroisomerized in the presence of said catalyst.

6. The process of claim 1 wherein a naphtha stream is dehydrogenated in the presence of said catalyst.

7. The process of claim 1 wherein a naphtha stream is hydrogenated in the presence of said catalyst.

8. The process of claim 1 wherein a naphtha stream is aromatized in the presence of said supported catalyst.

9. An improved process for the preparation of a hydrocarbon conversion catalyst which comprises mixing an aqueous solution of a sodium silicate having a ratio of $Na_2O$ to silica of at least 0.6/1 with a solution of sodium aluminate having a ratio of $Na_2O$ to $Al_2O_3$ of 1/1 to 3/1 in an amount such as the ratio of silica to alumina is in the range of 2.2/1 to 10/1, heating said mixture at a temperature of about 160° to about 250° F., for a period of time to form a crystalline zeolitic molecular sieve sodium alumino-silicate having a uniform pore diameter of about 13 Angstrom units, converting at least a portion of said sodium alumino-silicate to ammonium alumino-silicate by reacting said sodium alumino-silicate with at least one compound selected from the class consisting of ammonium hydroxide, an ammonium salt, a tetraalkyl ammonium salt and a tetraaryl ammonium salt, heating said ammonium comprising composition at elevated temperatures above about 400° F. for a period adequate to decompose said ammonium alumino-silicate, recovering a crystalline zeolitic molecular sieve containing not more than 10% sodium, calculated as $Na_2O$, impregnating said last named sieve with a platinum group metal and recovering a catalyst composition containing from 0.01 to 5.0% by weight of said platinum group containing metal.

10. The process of claim 9 wherein said platinum group containing metal is platinum.

11. The process of claim 9 wherein said platinum group metal is palladium.

12. An improved hydroforming process which comprises contacting a hydrocarbon fraction boiling in the motor fuel boiling range at 600° to 1000° F., and at 50 to 1000 p.s.i.g., with a platinum catalyst deposited on a crystalline zeolitic molecular sieve alumino-silicate base having uniform pore diameter between 6 and 15 Angstrom units, said molecular sieve being further characterized in that it contains no more than about 10% sodium calculated as $Na_2O$.

13. An improved hydroisomerization process which comprises contacting a hydrocarbon fraction at elevated temperatures with a platinum group catalyst deposited on a crystalline zeolitic molecular sieve alumino-silicate base having a uniform pore diameter between 6 and 15 Angstrom units, said molecular sieve being further characterized in that it contains no more than 10% sodium calculated as $Na_2O$.

14. The process of claim 13 wherein said base contains between 0.01 to 5.0% by weight of said platinum group metal.

15. The process of claim 14 wherein said metal is platinum.

16. The process of claim 14 wherein said metal is palladium.

17. An improved hydrocarbon conversion catalyst comprising a crystalline zeolitic molecular sieve alumino-silicate carrier impregnated with a platinum group metal, said carrier having uniform pore openings between 6 and 15 Angstrom units and containing no more than 10% sodium, calculated as $Na_2O$.

18. The composition of claim 17 wherein said platinum group metal is present to the extent of 0.01 to 5.0% by weight of the total composition.

19. The composition of claim 18 wherein said platinum group metal is platinum.

20. The composition of claim 18 wherein said platinum group metal is palladium.

References Cited in the file of this patent

UNITED STATES PATENTS

| | | |
|---|---|---|
| 1,840,450 | Jaeger et al. | Jan. 12, 1932 |
| 1,965,923 | Griessbach | July 10, 1934 |
| 2,270,044 | Fulton et al. | Jan. 13, 1942 |
| 2,283,173 | Bates | May 19, 1942 |
| 2,382,951 | Ahlberg et al. | Aug. 21, 1945 |
| 2,469,733 | Kearby | May 10, 1949 |
| 2,834,429 | Kinsella et al. | May 13, 1958 |
| 2,859,170 | Dickens et al. | Nov. 4, 1958 |
| 2,904,607 | Mattox et al. | Sept. 15, 1959 |
| 2,962,435 | Fleck et al. | Nov. 29, 1960 |

FOREIGN PATENTS

| | | |
|---|---|---|
| 715,474 | Great Britain | Apr. 10, 1951 |

UNITED STATES PATENT OFFICE
CERTIFICATE OF CORRECTION

Patent No. 2,971,904 February 14, 1961

Elroy Merle Gladrow et al.

It is hereby certified that error appears in the above numbered patent requiring correction and that the said Letters Patent should read as corrected below.

Column 4, line 53, for "63.5" read -- 53.5 --; column 5, line 9, for "2" read -- 3 --.

Signed and sealed this 21st day of September 1965.

(SEAL)
Attest:

ERNEST W. SWIDER
Attesting Officer

EDWARD J. BRENNER
Commissioner of Patents